(12) United States Patent
Sethi et al.

(10) Patent No.: US 10,468,944 B2
(45) Date of Patent: Nov. 5, 2019

(54) SYSTEM AND METHOD FOR SYNCHRONOUS CONDENSING

(71) Applicant: General Electric Company, Schenectady, NY (US)

(72) Inventors: Vineet Sethi, Houston, TX (US); Robert Darin Swartz, Houston, TX (US)

(73) Assignee: General Electric Company, Schenectady, NY (US)

( * ) Notice: Subject to any disclaimer, the term of this patent is extended or adjusted under 35 U.S.C. 154(b) by 194 days.

(21) Appl. No.: 15/415,622

(22) Filed: Jan. 25, 2017

(65) Prior Publication Data
US 2018/0212492 A1  Jul. 26, 2018

(51) Int. Cl.
| F01D 15/10 | (2006.01) |
|---|---|
| F02C 6/00 | (2006.01) |
| H02K 7/18 | (2006.01) |
| F02C 7/36 | (2006.01) |
| H02K 7/108 | (2006.01) |
| G05F 1/70 | (2006.01) |
| H02J 3/18 | (2006.01) |
| H02K 7/10 | (2006.01) |

(52) U.S. Cl.
CPC ............ *H02K 7/1823* (2013.01); *F02C 6/00* (2013.01); *F02C 7/36* (2013.01); *G05F 1/70* (2013.01); *H02J 3/1885* (2013.01); *H02J 3/1892* (2013.01); *H02K 7/10* (2013.01); *H02K 7/108* (2013.01); *F05D 2220/76* (2013.01); *Y02E 40/32* (2013.01)

(58) Field of Classification Search
CPC ........ H02K 7/10; H02K 7/108; H02K 7/1823; F02C 7/36; F02C 6/00
See application file for complete search history.

(56) References Cited

U.S. PATENT DOCUMENTS

| 2,892,524 | A | | 6/1959 | Sinclair | |
|---|---|---|---|---|---|
| 3,563,354 | A | | 2/1971 | Sigg | |
| 3,580,371 | A | * | 5/1971 | Kron | F16D 23/04 192/103 F |
| 3,589,488 | A | | 6/1971 | Clements | |
| 3,733,095 | A | * | 5/1973 | Sinclair | F03B 11/00 290/1 R |
| 3,835,642 | A | * | 9/1974 | Amann | B64D 13/06 417/319 |
| 3,868,004 | A | | 2/1975 | Clements et al. | |
| 4,051,679 | A | * | 10/1977 | Collin | B63H 23/08 192/218 |

(Continued)

FOREIGN PATENT DOCUMENTS

CN           204113964 U    1/2015

*Primary Examiner* — Tulsidas C Patel
*Assistant Examiner* — Thomas K Quigley
(74) *Attorney, Agent, or Firm* — Fletcher Yoder, P.C.

(57) ABSTRACT

A method includes aligning a generator shaft axis of a generator, a clutch axis of a clutch, and a pump axis of a pump along a common axis. The method also includes coupling a supply line from the pump to a radial surface of the clutch. Further, the generator is configured to operate in a power generation mode and a synchronous condensing mode, and the pump is configured to supply a lubricant to the clutch in a radial direction that is substantially perpendicular to the common axis.

19 Claims, 4 Drawing Sheets

(56) References Cited

U.S. PATENT DOCUMENTS

| | | | | |
|---|---|---|---|---|
| 4,118,927 A | * | 10/1978 | Kronogard | F02C 7/36 60/39.163 |
| 4,170,905 A | * | 10/1979 | Collin | B63H 23/16 74/355 |
| 4,932,206 A | * | 6/1990 | Sawyer | F01D 17/16 418/160 |
| 5,311,062 A | * | 5/1994 | Farkas | H02J 9/066 290/1 R |
| 5,421,702 A | * | 6/1995 | Revak | F01D 25/20 184/6.28 |
| 5,513,719 A | * | 5/1996 | Moroto | B60K 6/24 180/65.21 |
| 5,610,500 A | * | 3/1997 | Giberson | H02K 7/083 322/10 |
| 5,635,805 A | * | 6/1997 | Ibaraki | B60K 6/46 318/139 |
| 5,755,314 A | * | 5/1998 | Kanda | F16D 25/0638 192/113.35 |
| 5,845,483 A | * | 12/1998 | Petrowicz | F02C 7/262 60/788 |
| 5,886,505 A | * | 3/1999 | Giberson | H02K 7/083 310/261.1 |
| 6,079,535 A | * | 6/2000 | Mueller | B60K 17/34 180/247 |
| 6,093,975 A | | 7/2000 | Peticolas | |
| 6,140,803 A | * | 10/2000 | Hurley | H02J 3/42 307/87 |
| 6,897,577 B2 | | 5/2005 | Weeber et al. | |
| 7,615,884 B2 | * | 11/2009 | McMaster | F03D 9/00 290/55 |
| 8,816,521 B2 | | 8/2014 | Kleen et al. | |
| 8,963,350 B1 | * | 2/2015 | Boulden | F01D 15/10 290/4 R |
| 9,140,194 B2 | * | 9/2015 | Ertz | F01D 25/18 |
| 9,601,925 B2 | * | 3/2017 | Stinessen | H02J 4/00 |
| 2006/0078445 A1 | * | 4/2006 | Carter, III | B64D 41/00 417/423.6 |
| 2008/0314038 A1 | * | 12/2008 | Tozawa | E02F 9/2075 60/414 |
| 2009/0096212 A1 | * | 4/2009 | Turner | F03D 7/0284 290/44 |
| 2009/0288408 A1 | * | 11/2009 | Tozawa | E02F 9/2075 60/435 |
| 2010/0038473 A1 | * | 2/2010 | Schneider | B64D 27/24 244/60 |
| 2010/0056315 A1 | * | 3/2010 | Scholte-Wassink | F16N 7/38 475/159 |
| 2011/0012365 A1 | * | 1/2011 | Becker | F03D 80/70 290/55 |
| 2011/0142648 A1 | * | 6/2011 | Swift | F02C 3/10 416/162 |
| 2011/0232477 A1 | * | 9/2011 | Taki | F01M 13/0011 92/82 |
| 2012/0091933 A1 | * | 4/2012 | Inamura | B60L 7/06 318/400.3 |
| 2013/0098200 A1 | * | 4/2013 | Kurihara | B60K 17/10 74/661 |
| 2015/0059347 A1 | * | 3/2015 | Clayton | F02C 7/36 60/772 |
| 2016/0036230 A1 | * | 2/2016 | Day | H02J 3/1885 307/127 |
| 2016/0053691 A1 | * | 2/2016 | Ernst | F02C 3/107 415/121.3 |
| 2016/0097445 A1 | * | 4/2016 | Jongebloed | F16H 57/043 74/405 |
| 2016/0105078 A1 | * | 4/2016 | Santini | F02C 7/36 290/52 |

* cited by examiner

SYSTEM AND METHOD FOR SYNCHRONOUS CONDENSING

BACKGROUND OF THE INVENTION

The subject matter disclosed herein relates to power generation units, and more particularly, to power generation units with a synchronous condenser.

Gas turbine systems generally include a compressor, a combustor, and a turbine. The combustor combusts a mixture of compressed air and fuel to produce hot combustion gases directed to the turbine to produce work, such as to drive an electrical generator or other load. A gas turbine engine combined with an electrical generator may collectively make up a power generation unit (e.g., a gas turbine generator). Such power generation units generally provide power to a power grid with an alternating current at a nominal frequency. Various loads connected to the power grid affect a power factor of the power grid. A synchronous condenser coupled to the power grid may be utilized to adjust the power factor of the power grid. Some electrical generators of power generation units may be configured to operate as a synchronous condenser. However, the modification of power generation units to operate as a synchronous condenser may increase costs and a footprint of the power generation unit.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a generator coupled to a generator shaft about a generator shaft axis. The generator is configured to operate in a power generation mode and a synchronous condensing mode, the generator is configured to supply a power output to a power grid when in the power generation mode, and the generator is configured to modify power on the power grid when in the synchronous condensing mode. The system also includes a clutch disposed about a clutch axis, and a pump coupled to the clutch and disposed about a pump axis. The clutch is configured to engage the generator shaft with a turbine shaft in the power generation mode, and to disengage the generator shaft with the turbine shaft in the synchronous condensing mode. The pump is configured to supply lubricant to the clutch. Further, the generator, the clutch, and the pump are axially aligned such that the generator shaft axis, the clutch axis, and the pump axis form a common axis.

In a second embodiment, a system includes a generator coupled to a generator shaft about a common axis, a clutch disposed about the common axis, a pump disposed about the common axis, and a gear box configured to transfer rotational energy from a turbine shaft to the generator shaft. The generator is configured to operate in a power generation mode to supply a power output to a power grid, and a synchronous condensing mode to modify power on the power grid. The clutch is configured to engage the generator shaft with a turbine shaft in the power generation mode, and to disengage the generator shaft with the turbine shaft in the synchronous condensing mode. The pump is configured to supply a lubricant to the clutch in a radial direction that is substantially perpendicular to the common axis, and the turbine shaft is radially offset from the common axis.

In a third embodiment, a method includes aligning a generator shaft axis of a generator, a clutch axis of a clutch, and a pump axis of a pump along a common axis. The method also includes coupling a supply line from the pump to a radial surface of the clutch. Further, the generator is configured to operate in a power generation mode and a synchronous condensing mode, and the pump is configured to supply a lubricant to the clutch in a radial direction that is substantially perpendicular to the common axis.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
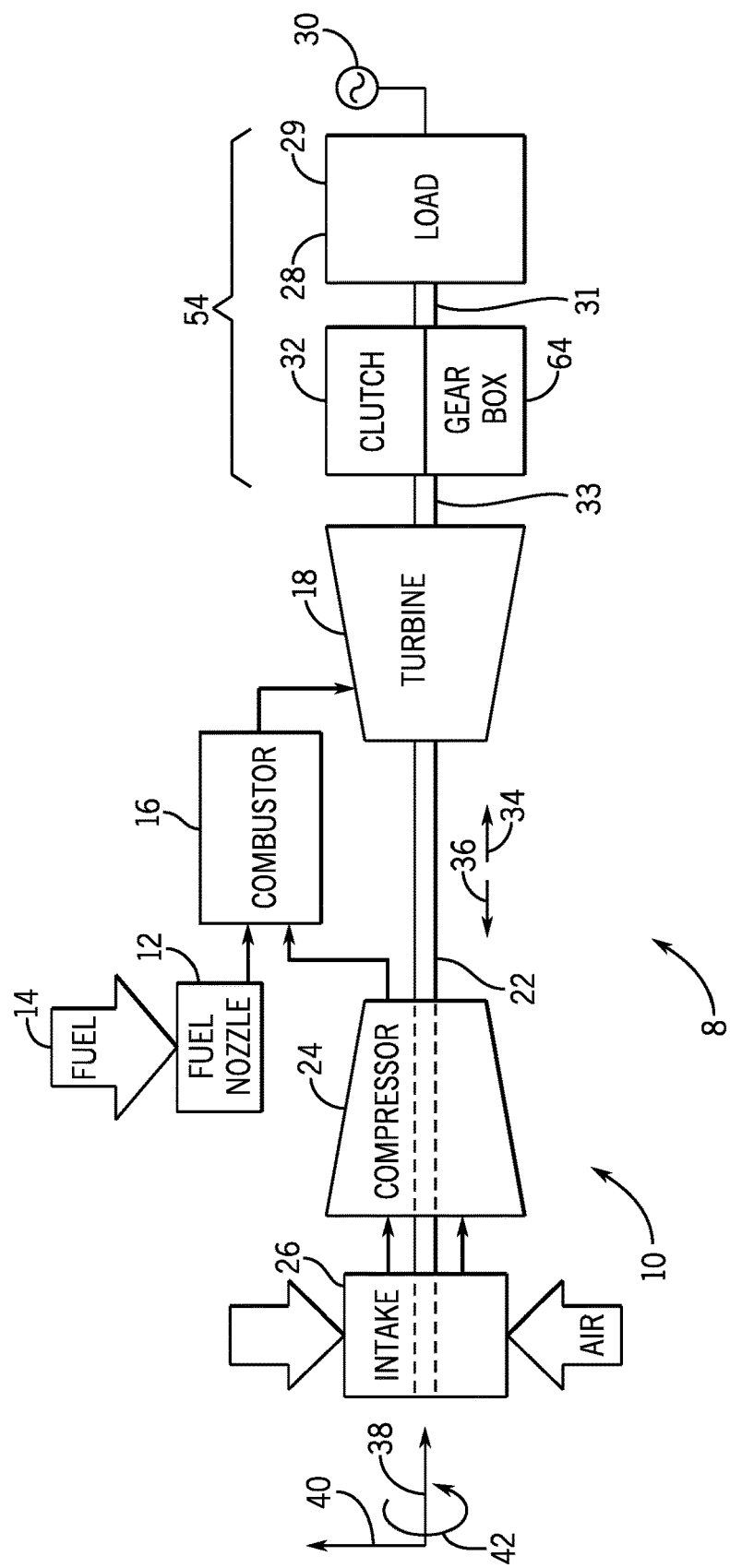
FIG. 1 illustrates a block diagram of an embodiment of a power generation unit.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The disclosed embodiments are directed to systems and methods of modifying the power of a power grid, such as by generating power to supply to the power grid or adjusting a power factor of the power grid. A power generation unit supplies power to the power grid via a generator. A generator may be powered by machinery (e.g., a gas turbine engine, steam turbine engine, reciprocating engine). The gas turbine engine may be, for example, an aeroderivative gas turbine engine. Examples of the aeroderivative gas turbine engine include the LM6000 series of aeroderivative gas turbines manufactured by General Electric Company of Schenectady, N.Y.

In some embodiments, the power generation unit may be used to stabilize a power grid. As discussed below, the embodiments of the power generation unit may utilize an integrated inline system of a gear box, a synchronous condenser, and a mechanically driven (e.g., shaft driven) pump. The generator of the power generation unit discussed above may operate as a synchronous condenser, at least in part, through utilization of a clutch. The clutch may be configured to disengage a generator shaft from a turbine shaft. When the generator shaft is disengaged from the turbine shaft, the generator shaft may spin freely such that the generator operates as a synchronous condenser to the power grid (e.g., during a synchronous condensing mode). Conversely, the clutch may also be configured to engage the generator shaft with the turbine shaft when the power generation unit is in a power generation mode. The turbine shaft may be engaged with the generator shaft within the gear box. For example, within the gear box, a first gear may be disposed on the turbine shaft and interact with a second gear that is disposed on the generator shaft. The first and second gear may have a gear ratio such that the first gear and the turbine shaft rotate at a higher speed relative to the second gear and the generator shaft.

Furthermore, the gear box, clutch, generator, generator bearings, or any combination thereof, may utilize lubrication (e.g., lube oil). In some embodiments, a lube oil supply pump may be integrated with the clutch and generator shaft. For example, the lube oil supply pump may be disposed in line with the clutch and the generator shaft such that the lube oil supply pump, the clutch, and the generator shaft share a common longitudinal axis. The lube oil supply pump may be configured to be powered mechanically by the generator shaft. The lube oil supply pump may also be configured to supply lube oil to components of the power generation unit.

The generator of the power generation unit supplies power to the power grid in a power generation mode. Various loads on the power grid draw energy from the power grid. However, some loads (e.g., reactive loads) may temporarily store energy from the power grid and return energy back to the power grid. A reactive load on the power grid may affect a power factor of the power grid because the power drawn (e.g., apparent power) by the reactive load is different than the power utilized (e.g., real power) by the reactive load. For example, there may be some power factor disturbances when power generation units are unexpectedly added or removed from a power grid, or when a load connected to the power grid is unexpectedly added or dropped. The power factor is a ratio of the real power of a circuit to the apparent power of the circuit. A low power factor may decrease transmission efficiency and increase equipment costs.

Turning now to the figures, FIG. 1 illustrates an embodiment of a power generation unit 8 with a turbine system 10. In some embodiments, the power generation unit 8 may include a mobile aeroderivative gas turbine system. The turbine system 10 may use liquid or gas fuel, such as distillate fuel, natural gas, and/or a hydrogen rich synthetic gas, to drive the turbine system 10. As depicted, the fuel nozzles 12 intake a fuel supply 14, mix the fuel with oxidant (e.g., air, oxygen-enriched air, oxygen-reduced air), and distribute the fuel-oxidant mixture into a combustor 16 in a suitable ratio for combustion, emissions, fuel consumption, and power output. The turbine system 10 may include fuel nozzles 12 located inside one or more combustors 16. The fuel-oxidant mixture combusts in a chamber within the combustor 16, thereby creating hot pressurized exhaust gases. The combustor 16 directs the exhaust gases through a turbine 18. As the exhaust gases pass through the turbine 18, the gases force turbine blades to rotate a shaft 22 along an axis of the turbine system 10. As illustrated, the shaft 22 may be connected to various components of the turbine system 10, including a compressor 24. Blades of the compressor 24 may be driven by the shaft 22. As the shaft 22 rotates, the blades within the compressor 24 also rotate, thereby compressing oxidant (e.g., air) from an air intake 26 through the compressor 24 and into the fuel nozzles 12 and/or combustor 16.

The shaft 22 may also be connected to a load 28, such as an electrical generator in a power plant or a gas compressor in a refinery, for example. The load 28 may include any one or more suitable devices capable of being powered by the rotational output of the turbine system 10. As discussed herein, the load 28 may include a generator 29; however, it may be appreciated that the turbine 18 may drive loads in addition to the generator 29. The generator 29 may be used to provide power to an electrical power grid 30 when the system 10 of the power generation unit 8 is in a power generation mode. Furthermore, the generator 29 may be configured as synchronous condenser, as discussed in detail below.

A clutch 32 couples a generator shaft 31 to a turbine shaft 33. In some embodiments, the clutch 32 is a synchro-self-shifting clutch manufactured by the SSS Clutch Company of New Castle, Del. In some embodiments, the clutch 32 may be a dog clutch, friction clutch, or hydraulic clutch. The clutch 32 is engaged in power generation mode, thereby coupling the generator shaft 31 to the turbine shaft 33. While in power generation mode, the power generation unit 8 may supply power to the power grid 30. However, the clutch 32 may be disengaged when the power generation unit 8 is in a synchronous condensing mode, thereby disconnecting the generator shaft 31 from the turbine shaft 33. In the synchronous condensing mode, the generator shaft 31 may spin freely while the generator 29 supplies reactive power to the power grid 30. Additionally, or in the alternative, the generator shaft 31 may spin freely while the generator 29 absorbs reactive power from the power grid 30. While in synchronous condensing mode, the power generation unit 8 may be controlled to adjust a power factor of the power grid 30. For example, the generator 29 may be configured to provide reactive power to the power grid 30 or to absorb reactive power from the power grid 30 to maintain a power factor of the electrical power grid. Throughout the description herein, a set of directions for reference are used, e.g., a downstream direction 34, an upstream direction 36, an axial direction 38, a radial direction 40, and a circumferential direction 42.

Figure 2:
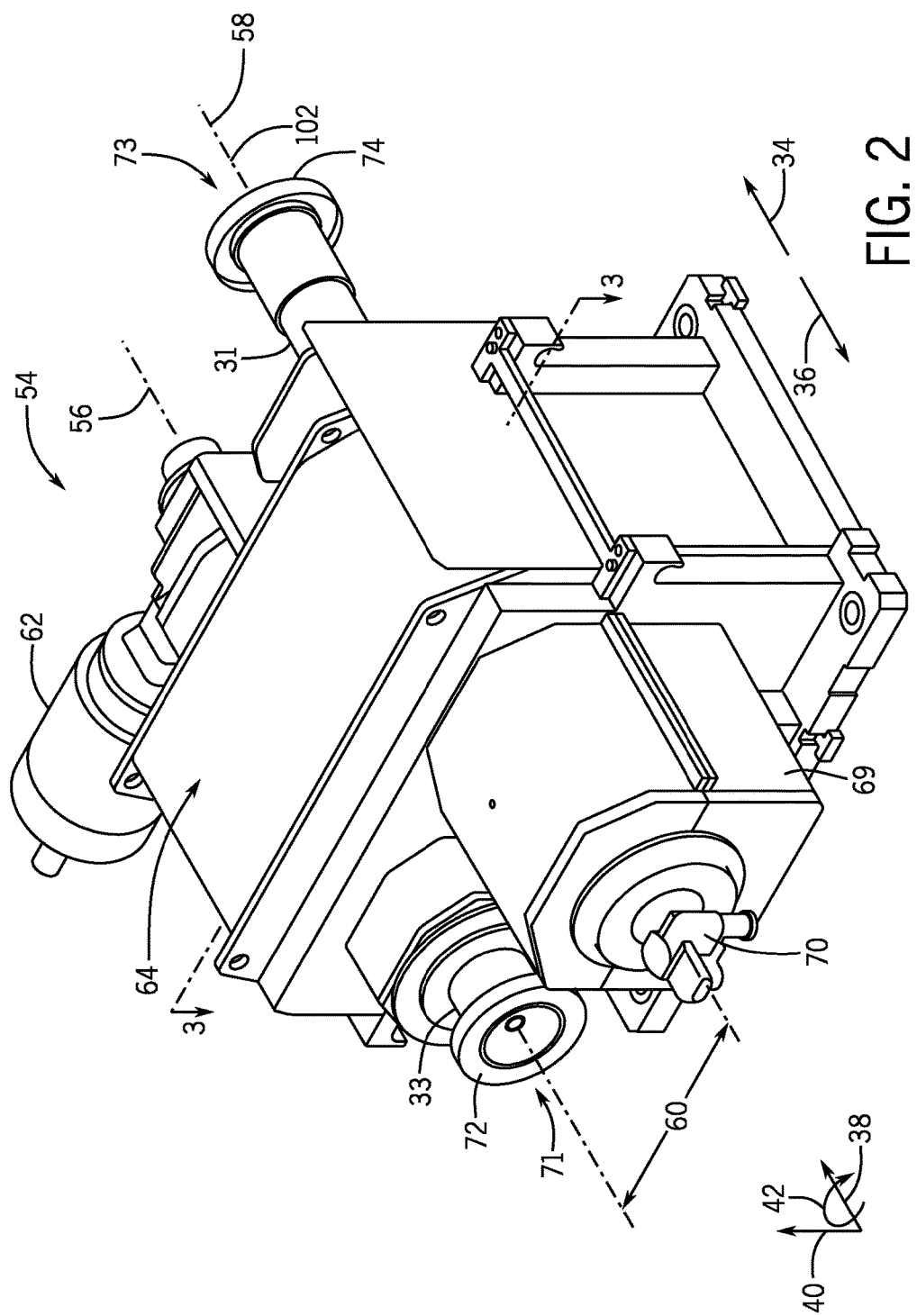
FIG. 2 illustrates a perspective view of an embodiment of a downstream portion of the power generation unit of FIG. 1.

FIG. 2 illustrates a perspective view of an embodiment of a downstream portion 54 of the power generation unit 8 of FIG. 1. A turning gear 62 (e.g., starter) coupled to the turbine shaft 33 may be configured to start the drive train (e.g., the generator 29, the turbine 18, and the gear box 64). Further, the turbine shaft 33 (e.g., high-speed shaft) has a turbine shaft axis 56 (e.g., high-speed shaft axis), and the generator shaft 31 (e.g., low-speed shaft) has a generator shaft axis 58 (e.g., low-speed shaft axis). The turbine shaft axis 56 and the generator shaft axis 58 may be parallel and have a radial offset 60. In the current embodiment, the radial offset 60 is in a horizontal direction. However, in some embodiments, the radial offset 60 may be in the vertical direction with the turbine shaft axis 56 above or below the generator shaft axis 58.

Figure 3:
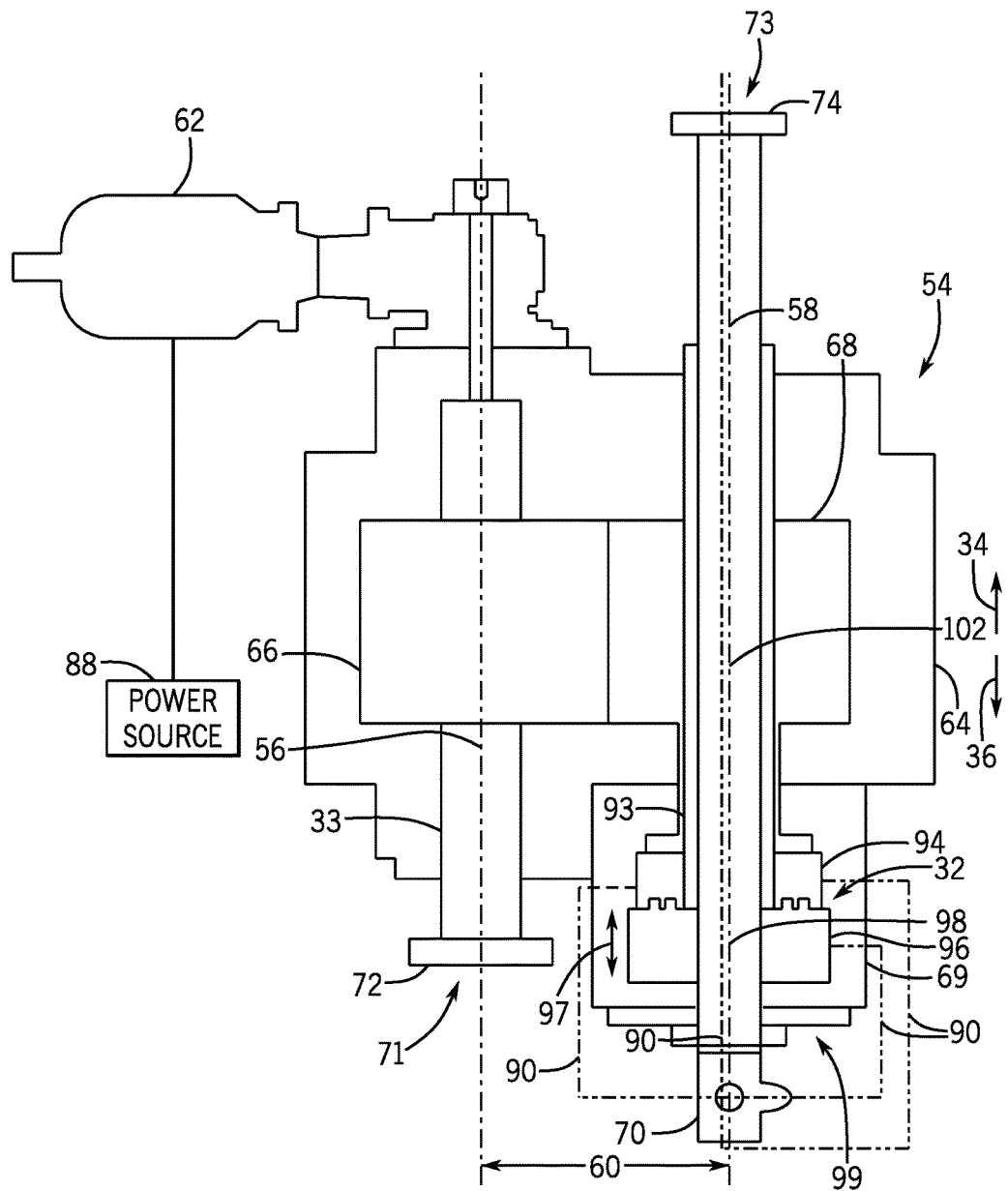
FIG. 3 illustrates a cross-sectional view of an embodiment of the downstream portion of FIG. 2.

Furthermore, the turbine shaft 33 is coupled to the generator shaft 31 via a gear box 64. Specifically, a first gear 66 of the gear box 64 coupled to the turbine shaft 33 drives a second gear 68 of the gear box 64 coupled to the generator shaft 31, as shown in FIG. 3. It may be appreciated that the gear box 64 couples a high-speed shaft to a low-speed shaft via a quill shaft. As discussed herein, the high-speed shaft may be referred to as the turbine shaft 33 although embodiments of the high-speed shaft in the gear box 64 may be coupled to the turbine shaft 33 of the turbine 18, and the low-speed shaft may be referred to as the generator shaft 31 although embodiments of the low-speed shaft in the gear box 64 may be coupled to the generator shaft 31. The first and second gear 66, 68 may have a gear ratio so that the turbine shaft 33, which may rotate at a certain speed, drives the generator shaft 31 to rotate at a slower speed. For example, a ratio of the turbine shaft to the generator shaft may be approximately 3,930 to 3,000 rpm, 3,930 to 3,600 rpm, or 3,600 to 3,000 rpm. However, the turbine shaft speed to generator shaft speed ratio may adjust based at least in part on a load drawn from the power grid 30 and/or the configuration of the power generation unit 8.

The generator shaft 31, pump 70, clutch 32, second gear 68, and generator 29 may all be axially aligned about the generator shaft axis 58. The generator 29 may be coupled in the downstream direction 34 to a downstream end 73 of the generator shaft 31 via a generator shaft flange 74. The turbine 18 may be coupled in the upstream direction 36 to an end 71 of the turbine shaft 33 via a turbine shaft flange 72. In some embodiments, the downstream portion 54 of the power generation unit 8 may be disposed above a tank (e.g., a fuel tank).

FIG. 3 illustrates a cross-sectional view of an embodiment of the downstream portion 54 of the power generation unit 8, taken along line 3-3 of FIG. 2. As discussed above, the turbine shaft 33 rotates about the turbine axis 56. The first gear 66 (e.g., high-speed gear) is directly coupled to the turbine shaft 33 and also rotates about the turbine axis 56. The first gear 66 is also directly coupled to the second gear 68 (e.g., low-speed gear) through gear teeth for a smooth transmission of power. It should be noted that throughout the description herein, the first gear 66 and the second gear 68 may refer to the gear set that is engaged within the gear box 64. It should further be noted that there may be more than two gears (e.g., a gear set) within the gear box 64 that can be configured for various gear ratios depending upon the speed reduction for an application of the turbine 18 and generator 29. Multiple reductions or stages might be utilized with alternative gear train arrangements for different overall gear ratios or different power outputs. The second gear 68 is coupled to the clutch 32, which is coupled to the generator shaft 31. The second gear 68, clutch 32, and the generator shaft 31 may rotate about the generator shaft axis 58. Therefore, when the turbine 18 drives the turbine shaft 33 and the first gear 66, the second gear 68 will also rotate. Due to the gear ratio of the gear box 64 between the first gear 66 and the second gear 68, the generator shaft 31 may rotate at a slower speed than the turbine shaft 33. For example the turbine shaft 33 may rotate at approximately 3,930 rpm while the generator shaft 31 rotates at approximately 3,000 or 3,600 rpm. In some embodiments, the turbine shaft 33 may rotate at approximately 3,600 rpm while the generator shaft 31 rotates at approximately 3,000 rpm. In some embodiments, the turbine shaft 33 and/or the first gear 66 may rotate faster than 3,930 rpm. In some embodiments, the generator shaft 31 and/or the second gear 68 may rotate slower than 3,000 rpm.

When the power generation unit 8 is in power generation mode, the clutch 32 couples the generator shaft 31 to the second gear 68 so that the generator shaft 31 and the second gear 68 may rotate at the same speed. Therefore, when the power generation unit 8 is in power generation mode, the turbine shaft 33 rotates to transfer energy through the gears 66, 68, to the generator shaft 31, thereby causing the generator shaft 31 to rotate. For example, the gear box 64 may be configured to transfer rotational energy from the turbine shaft 33 to the generator shaft 31. The generator shaft 31 is coupled to the generator 29 so that when the generator shaft 31 rotates, the generator 29 will convert at least a portion of the rotational mechanical energy of the generator shaft 31 to electrical energy that may be supplied to the electrical power grid 30. During power generation mode and synchronous condensing mode, the generator shaft 31 may drive the pump 70. In other words, the generator shaft 31 is configured to supply mechanical power to the pump 70 to drive the pump 70. In some embodiments, a power source 88 (e.g., battery, power grid) powers the turning gear 62. The pump 70 may supply lubricant (e.g., lube oil) to the clutch 32 radially through one or more supply lines 90. Specifically, the pump 70 may supply lubricant to the clutch 32 in a radial direction 40 that is substantially perpendicular to the generator shaft axis 58. As discussed herein, the term "substantially perpendicular" includes angles that are within 20 degrees of perpendicular. Further, the pump 70 may also supply lubricant to other elements of the power generation unit 8 (e.g., generator shaft 33, generator 29, generator bearings, first gear 66, second gear 68, gear box 64, or any combination thereof). The pump 70 may supply lubricant through supply lines 90 oriented in the axial direction 38 or the radial direction 40 relative to elements of the power generation unit 8.

When the power generation unit 8 is in synchronous condensing mode, the clutch 32 may disengage the generator shaft 31 from the second gear 68. When the second gear 68 is disengaged from the generator shaft 31 in the synchronous condenser mode, the turbine shaft 33 may stop rotating while the generator shaft 31 continues to rotate. The power grid 30 may drive the generator 29 and the generator shaft 31 in the synchronous condensing mode. In some embodiments, while in synchronous condensing mode, the rotation of the generator shaft 31 allows for reactive power to be absorbed from the grid 30 to adjust the power factor. In some embodiments, the rotation of the generator shaft 31 allows for reactive power to be provided to the grid 30 to adjust the power factor. The pump 70 may supply lubricant (e.g., lube oil) to elements of the power generation unit 8 (e.g., the clutch 32, the gear box 64, the generator shaft 31, the generator 29, generator bearings, or any combination thereof). The pump 70 may be powered via rotation (e.g., mechanical power) of the generator shaft 31. The pump 70 may supply lubricant to the elements via the supply lines 90. There may be one or more supply lines 90 to supply lubricant to the various elements of the power generation unit 8 mentioned above. Further, pump 70 may supply lubricant through the supply lines oriented in the radial direction 40 and/or the axial direction relative to the elements of the power generation unit 8.

When switching between a power generation mode and a synchronous condensing mode, the clutch 32 may engage or disengage the generator shaft 32 from the gear box 64. More specifically, the turbine 18 may be shut off while the power generation unit 8 shifts to a synchronous condensing mode, and the turbine shaft 33 slows down and eventually stops rotating. The turbine shaft 33 is directly coupled to the first gear 66, which is directly coupled to the second gear 68 within the gear box 64. Therefore, when the turbine shaft 33 slows and eventually stops rotating, the first gear 66 and the second gear 68 correspondingly also slow and eventually stop rotating. The second gear 68 may be coupled to the generator shaft 31 through a quill shaft 93. The quill shaft 93 may be directly coupled to an input portion 94 of the clutch 32. The input portion 94 of the clutch 32 may be coupled to an output portion 96 of the clutch 32, which is directly coupled to the generator shaft 31. In an embodiment where the clutch 32 is a synchro-self-shifting clutch, if the input portion 94 rotates faster than or equal to the output portion 96, then the clutch engages and the second gear 68, the input portion 94, the output portion 96, and the generator shaft 31 may each rotate at the same speed (e.g., during power generation mode). If the output portion 96 rotates faster than the input portion 94, the clutch 32 disengages (e.g., during synchronous condensing mode). The output portion 96 may move as shown by arrow 97 to engage and disengage the input portion 94. Furthermore, during power generation mode when the clutch 32 is engaged, the turbine shaft 33, the first gear 66, the second gear 68, the input portion 94, the output portion 96, and the generator shaft 31 may rotate. During synchronous condensing mode when the clutch 32 is disengaged, the generator shaft 31 may rotate independently of the turbine shaft 33. For example, the turbine shaft 33, the first gear 66, the second gear 68, and the input portion 94 may not rotate while the output portion 96, and the generator shaft 31 may rotate independently of the turbine shaft 33.

The pump 70 may be a gear driven pump (e.g., gear pump), and as discussed above, may supply lubricant to elements of the power generation unit 8. In some embodiments, the pump 70 may be a positive displacement pump, an impulse pump, or a velocity pump. In some embodiments, the pump 70 may be powered by the rotation of the generator shaft 31. Further, lubricant (e.g., lube oil) from the pump 70 may be routed via one or more supply lines 90 to the gear box 64 (including the first gear 66 and the second gear 68), the generator shaft 33, the generator 29 (including generator bearings), the clutch 32, or any combination thereof. During synchronous condensing mode, the pump 70 may supply lubricant (e.g., lube oil) to only the generator 29 (including generator bearings), generator shaft 31, clutch 32, or any combination thereof. Accordingly, the turbine 18, the turbine shaft 33 and the gear box 64 may be shut down during synchronous condenser mode, and the pump 70 may not supply lubricant to the turbine shaft 33 or the gearbox 64 during the synchronous condenser mode. As a result, an overall use of lubricant (e.g., lube oil) for the power generation unit 8 may be less when the power generation unit 8 is in synchronous condensing mode than when the power generation unit 8 is in power generation mode. In some embodiments, a separate lube oil system may supply lubricant (e.g., lube oil) to the turbine 18 and the turbine shaft 33. Lubricant (e.g., lube oil) that is supplied to elements (e.g., the first gear 66 and the second gear 68) of the gear box 64 may be contained and may not leak or spill due at least to the gear box 64 containing the lubricant.

The turbine 18 and the first gear 66 are aligned in the axial direction 38 along the turbine shaft axis 56. The turbine 18 may be coupled to the turbine shaft flange 72 in the upstream direction 36 relative to the first gear 66. The generator 29, the generator shaft 31, the second gear 68, the clutch 32, and the pump 70 may be aligned in the axial direction 38 along the generator shaft axis 58. In some embodiments, the pump 70 is directly coupled to the clutch 32 and/or the clutch housing 69, and the pump 70 is aligned in the axial direction 38 upstream 36 of the clutch 32. The clutch 32 may be disposed upstream 36 of the second gear 68. The second gear 68 may be disposed upstream 36 of the generator 29. The generator 29 may disposed on the downstream end 73 of the generator shaft 31, and coupled to the generator shaft 31 via the generator shaft flange 74. Furthermore, the clutch 32 is disposed about a clutch axis 98, the pump is disposed about a pump axis 100. Together, the clutch axis 98, the pump axis 100, and the generator shaft axis 58 form a common axis 102.

Radial supply of lubricant to elements (e.g., the clutch 32, the generator shaft 31, gear box 64, the generator 29, or any combination thereof) via supply lines 90 enables the pump 70 to be mounted directly to an upstream end 99 of the clutch housing 69 (or clutch 32). For example, a power generation unit with a lubricant supply from the axial direction 38 may be retrofitted with an addition of the pump 70 on the upstream end 99 of the clutch housing 69 (or clutch 32) so that lubricant (e.g., lube oil) is supplied from the radial direction 40 instead of from the axial direction 38 to elements (e.g., the clutch 32, the gear box 64, the generator shaft 31, the generator 29, or any combination thereof) of the power generation unit 8. More specifically, a supply of lubricant from the axial direction 38 to a clutch may otherwise prevent the addition of a pump to the downstream end of the clutch. Furthermore, the addition of the pump 70 on the upstream end 99 of the clutch housing 69 (or clutch 32) may eliminate a separate lubricant source (e.g., an offset driven pump included on a gear box) for elements of the power generation unit 8. The addition of the offset driven pump may add complexity to the system, a parasitic load to the system, and reduce efficiency of the gear box. In some embodiments of the power generation unit 8, the gear box 64 may maintain an efficiency of at least 99 percent with the addition of the pump 70 on the upstream end 99 of the clutch housing 69 or clutch 32. As discussed above, the pump 70 may be mechanically driven via rotation of the generator shaft 31 and/or the clutch 32. In some embodiments, mechanical power from the generator shaft 31 used to drive the pump 70 may be less than two percent of a power output that is supplied to the power grid 30 from the generator 29.

Figure 4:
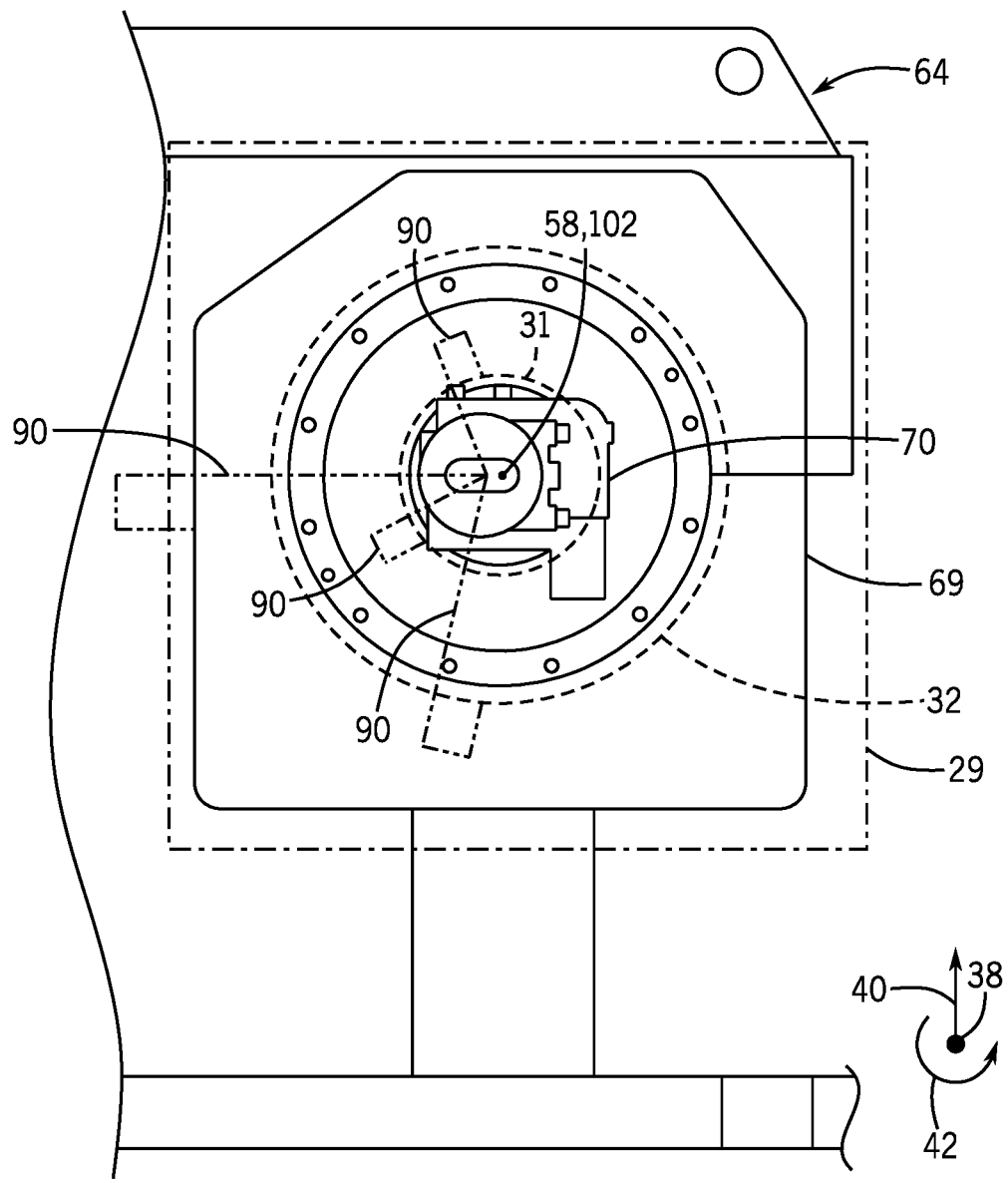
FIG. 4 illustrates an axial view of an embodiment of the downstream portion of FIG. 2.

FIG. 4 illustrates an axial view of the downstream end 54 of the power generation unit 8, taken along line 4-4 of FIG. 3. The pump 70, clutch 32, second gear 68, gear box 64, and generator/synchronous condenser 29 may each be aligned on the common axis 102. However, the turbine shaft 33 may be radially offset from the common axis 102. The general axial alignment of the clutch 32, the generator shaft 31, gear box 64 (e.g., the second gear 68), and the generator 29 on the generator shaft axis 58 enables lubricant (e.g., lube oil) from the pump 70 to be readily supplied to the clutch 32, the generator shaft 31, the gear box 64 (e.g., the second gear 68), and the generator 29, or any combination thereof. In some embodiments, the pump 70 may supply lubricant (e.g., lube oil) in the radial direction 40, through supply lines 90, and/or in the axial direction 38 (e.g., through the generator shaft 31 bore, the supply lines 90, or any combination thereof).

Technical effects of the invention include providing a compact system for configuring a generator of a power generation unit with a gear box for either a power generation mode or a synchronous condensing mode. Configuring the power generation unit for a power generation mode or a synchronous condensing mode may include integration of a clutch, and of a pump that is mounted to an upstream end of the clutch and driven by a generator shaft. In this configuration, the generator shaft, the clutch, and the pump are all axially aligned. The pump may supply lubricant (e.g., lube oil) axially or radially to the clutch, and to other components (e.g., generator and gear box). The addition of the pump to the downstream end of the clutch may reduce or eliminate other pumps of the system, as well as eliminate a separate pedestal for the clutch (e.g., a pedestal that supports the clutch, and in which lubricant may be supplied through). Furthermore, the location and function of the pump may improve the efficiency of the system, minimize design costs, and reduce the wear on the gas turbine components and their supporting systems. Further, the shaft-driven pump enables pump operation by mechanical means. Therefore, due to the mechanical nature of the pump, the pump may operate to supply lubricant regardless of electrical availability to the pump.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system comprising:
  a generator coupled to a generator shaft about a generator shaft axis, wherein the generator is configured to operate in a power generation mode and a synchronous condensing mode, the generator is configured to supply a power output to a power grid when in the power generation mode, and the generator is configured to modify power on the power grid when in the synchronous condensing mode;
  a clutch disposed about a clutch axis, wherein the clutch is configured to engage the generator shaft with a turbine shaft in the power generation mode, and the clutch is configured to disengage the generator shaft with the turbine shaft in the synchronous condensing mode; and
  a pump disposed about a pump axis, wherein the pump is configured to supply a lubricant to the clutch;
  wherein the generator, the clutch, and the pump are axially aligned such that the generator shaft axis, the clutch axis, and the pump axis form a common axis;
  wherein the clutch is disposed axially between the pump and the generator;
  wherein the generator shaft is configured to drive the pump when the generator is in the synchronous condensing mode.

2. The system of claim 1, wherein the generator shaft is coupled to the pump and is configured to supply a mechanical power to the pump to drive the pump.

3. The system of claim 1, wherein the pump is directly coupled to a clutch assembly having the clutch disposed in a clutch housing.

4. The system of claim 1, wherein the pump is configured to supply the lubricant to the clutch in a radial direction relative to the common axis.

5. The system of claim 1, wherein the pump is configured to supply the lubricant to at least one of the generator, a gear box, or any combination thereof.

6. The system of claim 1, comprising a gear box configured to transfer rotational energy from the turbine shaft to the generator shaft, wherein the turbine shaft is radially offset from the common axis.

7. The system of claim 1, wherein the pump is coupled to an end of the generator shaft.

8. The system of claim 6, wherein the gear box comprises a quill shaft disposed about the common axis, and the generator shaft is disposed at least partially within the quill shaft.

9. The system of claim 1, comprising a gas turbine coupled to the turbine shaft.

10. A system comprising:
  a generator coupled to a generator shaft about a common axis, wherein the generator is configured to operate in a power generation mode and a synchronous condensing mode, the generator is configured to supply a power output to a power grid when in the power generation mode, and the generator is configured to modify power on the power grid when in the synchronous condensing mode;
  a clutch disposed about the common axis, wherein the clutch is configured to engage the generator shaft with a turbine shaft in the power generation mode, and the clutch is configured to disengage the generator shaft with the turbine shaft in the synchronous condensing mode;
  a pump disposed about the common axis, wherein the pump is configured to supply a lubricant to the clutch in a radial direction relative to the common axis; and
  a gear box configured to transfer rotational energy from the turbine shaft to the generator shaft, wherein the turbine shaft is radially offset from the common axis;
  wherein the clutch is disposed axially between the pump and the generator;
  wherein the generator shaft is configured to drive the pump when the generator is in the synchronous condensing mode.

11. The system of claim 10, wherein the generator shaft is coupled to the pump and is configured to supply a mechanical power to the pump to drive the pump in the synchronous condensing mode.

12. The system of claim 10, wherein the gear box comprises a quill shaft disposed about the common axis, and the generator shaft is disposed at least partially within the quill shaft.

13. The system of claim 10, wherein the pump is directly coupled to a clutch assembly having the clutch disposed in a clutch housing.

14. The system of claim 10, wherein the pump is configured to supply the lubricant to at least one of the generator, a gear box, or any combination thereof.

15. The system of claim 10, comprising a gas turbine coupled to the turbine shaft.

16. A method comprising:
  aligning a generator shaft axis of a generator shaft of a generator, a clutch axis of a clutch, and a pump axis of a pump along a common axis, wherein the clutch is disposed axially between the pump and the generator, wherein the generator is configured to operate in a power generation mode and a synchronous condensing mode, wherein the clutch is configured to engage the generator shaft with a turbine shaft in the power generation mode, wherein the clutch is configured to disengage the generator shaft with the turbine shaft in the synchronous condensing mode, wherein the generator shaft is configured to drive the pump when the generator is in the synchronous condensing mode; and
  coupling a supply line from the pump to a radial surface of the clutch, wherein the pump is configured to supply a lubricant to the clutch in a radial direction relative to the common axis.

17. The method of claim 16, comprising coupling a gear box between the turbine shaft and the generator shaft, wherein the turbine shaft is radially offset from the common axis.

18. The method of claim 16, comprising coupling the pump directly to a clutch assembly having the clutch disposed in a clutch housing, and coupling the clutch to the generator shaft.

19. A system comprising:
- a generator coupled to a generator shaft about a generator shaft axis, wherein the generator is configured to operate in a power generation mode and a synchronous condensing mode, the generator is configured to supply a power output to a power grid when in the power generation mode, and the generator is configured to modify power on the power grid when in the synchronous condensing mode;
- a clutch disposed about a clutch axis, wherein the clutch is configured to engage the generator shaft with a turbine shaft in the power generation mode, and the clutch is configured to disengage the generator shaft with the turbine shaft in the synchronous condensing mode; and
- a pump disposed about a pump axis, wherein the pump is configured to supply a lubricant to the clutch;
- wherein the generator, the clutch, and the pump are axially aligned such that the generator shaft axis, the clutch axis, and the pump axis form a common axis;
- wherein the clutch is disposed axially between the pump and the generator;
- wherein the pump is directly coupled to a clutch assembly having the clutch disposed in a clutch housing.

* * * * *